Figure 1:
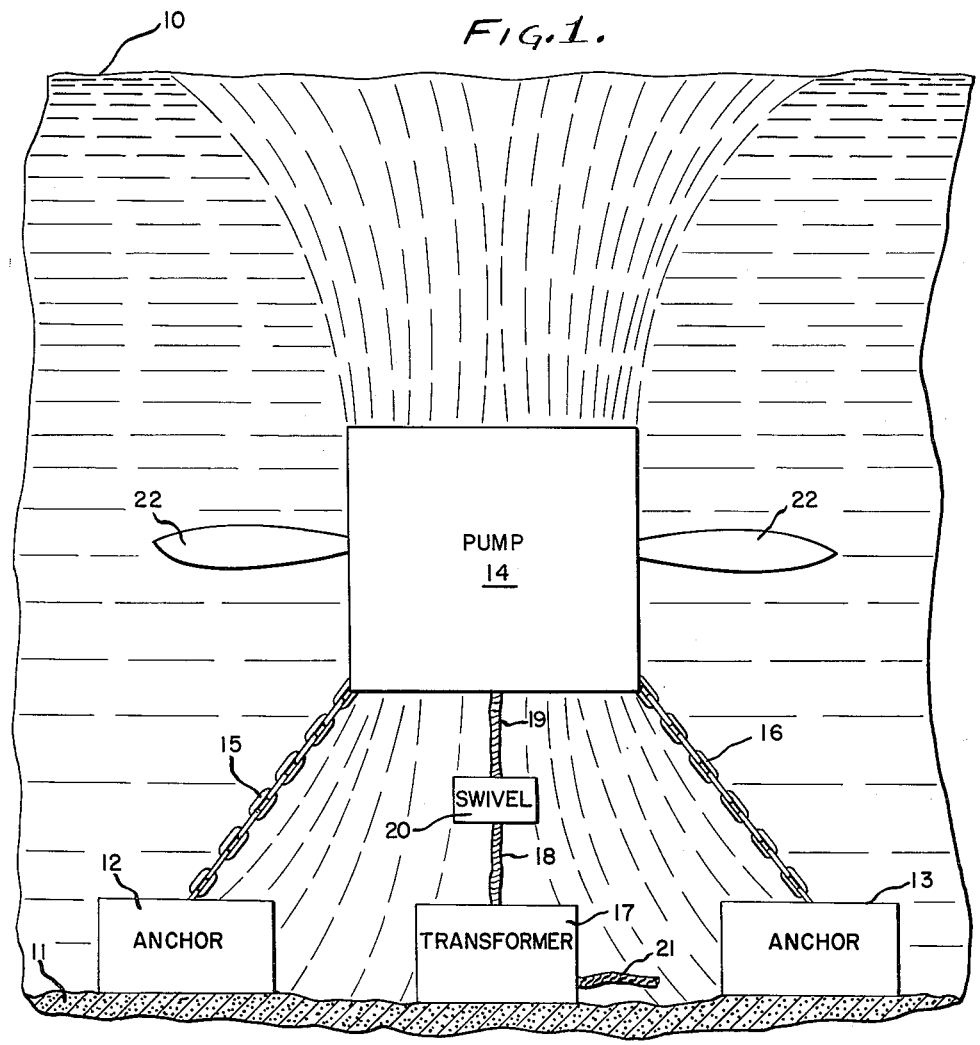

July 11, 1961 T. H. OSTER 2,991,622
NAVIGATION AID
Filed April 5, 1960 2 Sheets-Sheet 1

THOMAS H. OSTER
*INVENTOR.*

July 11, 1961     T. H. OSTER     2,991,622
NAVIGATION AID

Filed April 5, 1960                      2 Sheets-Sheet 2

THOMAS H. OSTER
INVENTOR.

2,991,622
NAVIGATION AID
Thomas H. Oster, 156 S. Franklin St., Dearborn, Mich.
Filed Apr. 5, 1960, Ser. No. 20,182
6 Claims. (Cl. 61—1)

This invention is concerned with the science of navigation and more particularly with a method and apparatus designed to permit year round or substantially year round navigation of bodies of water that are normally ice bound for a portion of each year. This invention is presented as an improvement on an invention upon which United States Letters Patent 2,417,519 was granted March 18, 1947 to Perrson and Forslind. This application is a continuation in part of my application Serial No. 361,947, filed June 16, 1953 and now abandoned.

This invention in its broader aspects is not limited to the prevention and elimination of ice from navigable waters. The process and apparatus described herein may be employed to advantage whenever a natural body of water tends under the prevailing conditions to have a surface temperature substantially higher or lower than four degrees centigrade which is the temperature of maximum density.

The operation of this invention is dependent upon the peculiar changes in density exhibited by water as its temperature changes. Water is most dense at four degrees centigrade or approximately thirty nine degrees Fahrenheit. Water which is warmer or cooler than this temperature is slightly but very definitely less dense. Having by definition assigned a density of exactly one to water at a temperature of four degrees centigrade (the temperature of maximum density), the density at zero degrees centigrade of liquid water is 0.99987. This represents a density decrease of less than one and one-third parts in ten thousand. Similarly, water at twenty degrees centigrade has a density of 0.99823.

It is this unique temperature density behavior of water which causes the so-called seasonal inversion of many large bodies of water. With the advent of cold weather the water near shore cools to the point of maximum density and this dense water flows as a submarine river to the deeper portions of the body of water more remote from shore. This thermally propelled circulation continues until substantially the entire body of water has been cooled to the point of maximum density. When this condition has been attained, further abstraction of heat from the surface produces a less dense water having a temperature less than four degrees and greater than zero degrees centigrade. Further cooling of this lighter surface layer of water results in the formation of surface ice.

This invention which takes advantage of this temperature density relationship of water is best understood by reference to the drawing which is a somewhat schematic cross section of a body of water in which has been installed an apparatus to practice the instant invention.

Figure 2:
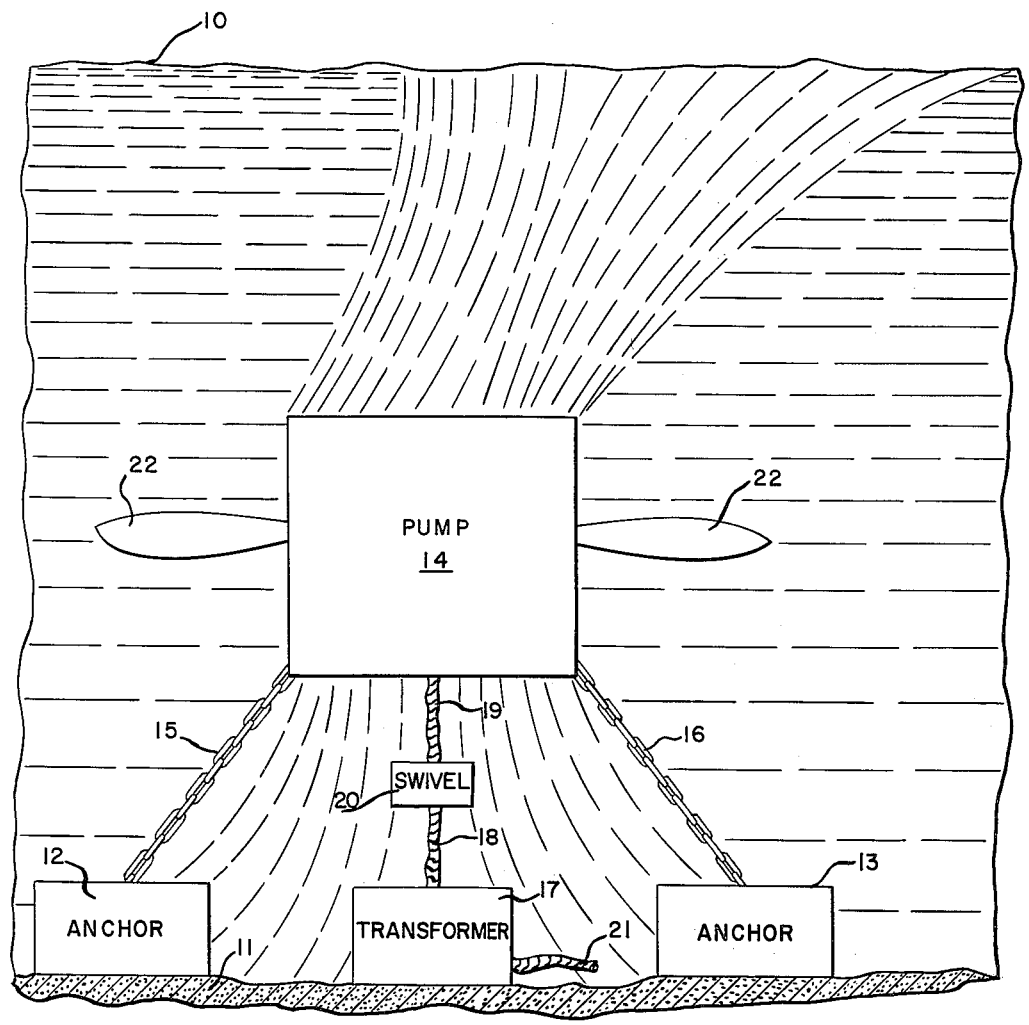

This invention may be best understood by reference to the figures of drawing in which:

FIGURE 1 is a schematic showing of one embodiment of the invention involving a vertically discharge current of water, and FIGURE 2 is a schematic showing of another embodiment of the invention involving a current of water which is tilted from the vertical.

In both of the figures of drawing the surface of the body of water is indicated by the numeral 10 and the bottom by the numeral 11. Anchor blocks 12 and 13 rest upon bottom 11. An electrically driven pump 14 is secured to anchor blocks 12 and 13 by chains or cables 15 and 16. Pump 14 is of the type commonly employed where it is desired to immerse the pump in the liquid to be pumped. Such pumps comprise the pumping mechanism per se, and the electric motor driving such pumping mechanism, usually mounted in a common casing and properly sealed to permit the operation of the electric motor while submerged for indefinite periods of time. The pump 14 is energized via submarine cable 21, transformer 17, cables 18 and 19 and swivel connection 20. Under normal circumstances both the transformer 17 and swivel connection 20 would be employed, but neither are absolutely necessary for the execution of the invention. As those skilled in the electrical arts readily appreciate, the transmission of energy over long distances electrically is best accomplished at higher voltages than are desirable for motor operation, and transformer 17 would usually be employed to reduce transmission voltage to motor voltage, although under some circumstances the voltages may be the same and hence render transformer 17 unnecessary.

Under certain circumstances it may be advantageous to dispense with anchor blocks 12 and 13 and secure pump 14 in position only through the mass of transformer 17, and cables 18 and 19, interconnected by swivel connection 20. If the motor voltage and transmission voltage are the same, an anchor block of sufficient mass may be substituted for transformer 17 to secure in place pump 14. When pump 14 is anchored only by transformer 17 or an equivalent mass, it is necessary to provide some means for compensating for the torque developed by the electric motor. This may advantageously be accomplished by means of arms 22 which are secured to the periphery of pump 14 and extend radially therefrom for a substantial distance. At the ends of arms 22 remote from pump 14 are mounted impeller blades (not shown) which are biased to propel water in the same direction as pump 14. In this manner the torque of the motor is neutralized and two concentric cylinders of water are impelled in the same vertical direction. The choice as to the neutraliation of the motor torque by specially spaced anchor blocks or by impellers at the end of radial arms will be dictated by the particular situation under consideration. Consideration would have to be given to such factors as depth of water, area of surface to be effected, and the probability of interference by surface craft. As shown in the drawing in which vertical distances have been greatly foreshortened, pump 14 has its intake side downward and on the intake side receives the comparatively warm water from the lower strata of the body of water and discharges this warm water in an unconfined stream from its discharge side which is directed upwardly from the top of pump 14. This unconfined stream of warm water will acquire through friction and diffusion a typical mushroom configuration. This maximum density warm water diffuses into and mixes with the colder and less dense surface and produces a mixture intermediate in temperature and density. As long as such a mixture is maintained on the surface, freezing of the surface is impossible without regard to atmospheric temperature. As a corollary to this statement it follows that this warm water flowing up from the lower strata will cause the melting of any surface ice which may have formed.

A typical use for this invention is the opening and maintenance in an open condition of a navigation channel across a normally frozen harbor or lake. To accomplish this end a series of pumps of the type described would be anchored along the channel it is desired to clear and energy supplied to such pumps from a land station. The spacing of these pumps would be dictated by local considerations such as severity of weather expected, width of channel desired, depth of water available, and relative costs of electric power and of construction of the pumps.

Apparatus for the practice of this invention would of course be anchored at a depth sufficient to clear vessels of the greatest anticipated draft. Sufficient buoyancy is to be included in pump 14 to insure that it rises to the limit permitted by its anchorage despite its own mass and the downward thrust from the water being moved upwards. The pump may be arranged to discharge the current of water in a vertical direction, or it may be found advantageous to tilt pump 14 from the vertical in the direction in which it is desired to cut a channel. In this way the warm water tends to cut a channel rather than a circular opening. The vertical current of water is depicted in FIGURE 1 and the tilted stream of water in FIGURE 2. The precise depth at which the pumps must be anchored should be individually decided upon consideration of the depth of water available, proximity to the next pump, winter temperatures and similar local considerations.

The precise type of pump to be employed is not material to the invention, although ordinarily it would be a radial flow centrifugal pump structurally closely resembling a low head hydraulic turbine with the water flow reversed. Since the maintenance of a substantial length of channel with the apparatus herein described would involve a considerable electric load, economies may be effected by supplying this load from a source variable both as to frequency and voltage. When only a minor amount of pumping is required to maintain an open channel, the system could be supplied with a low voltage and a correspondingly low frequency to operate the pumps at a low rate of speed with a savings in power cost and equipment. As the weather conditions became more severe, the voltage and frequency of the source would be raised together to operate the pumps at a higher rate of speed and pump larger volumes of water.

The utility of this invention is not confined to the sole use of ice prevention. The operation of these pumps during the warmer parts of the year will prevent stratification of the immediately adjacent water. In the warmer seasons, the water warms from the top down, and the warming of the lower strata is hindered by its tendency to sink due to its lower temperatures. If this natural summer stratification is nullified, very large masses of water can be substantially warmed and hence delay the day when the use of pumps to prevent freezing is required.

The elimination or decrease of natural warm weather stratification causes the body of water to present to the atmosphere a cooler surface. This cooler surface will substantially decrease evaporation losses from hydroelectric reservoirs and irrigation storage sites during warm weather. Applied on a large scale, this cool surface condition would have a favorable effect upon the temperatures of adjacent territory.

This invention has been described with respect to the flow being induced by pumps in a vertical direction upwards. It is equally within the province of this invention to direct such induced flow in any direction including downwardly. It is only necessary that the induced flow be substantially unconfined and have an appreciable vertical component, either directed upwardly or downwardly. While ordinary polyphase alternating current is primarily contemplated as a source of pump energy, it is obvious that any available type of energy may be employed.

The term "natural bodies of water" as used herein is intended to include bodies of water impounded by man made dams.

What is claimed is:

1. The process of maintaining at least a portion of a normally frozen surface of a naturally stratified natural body of water ice free comprising maintaining a pumping means within the warmer subsurface layers of said body of water and pumping a substantially gas free and unconfined current of said warmer subsurface water to the surface, said current having an effective vertical component whereby natural stratification of said body of water is decreased and the temperature of the body of water is made more uniform.

2. The process of maintaining at least a portion of a normally frozen surface of a naturally stratified natural body of water ice free comprising maintaining pumping means within the warmer subsurface layers of said body of water and pumping a substantially gas free and unconfined current of said warmer subsurface water to the surface, said current having an effective upward component whereby natural stratification of said body of water is decreased and the temperature of the body of water is made more uniform.

3. The process of decreasing the thermal stratification in a normally thermally stratified natural body of water comprising maintaining a pumping means within the heavier subsurface layers of said body of water and pumping a substantially gas free and unconfined current of said heavier subsurface water to the surface, said current having an effective vertical component whereby natural stratification of said body of water is decreased and the temperature of the body of water is made more uniform.

4. The process of decreasing the thermal stratification in a normally thermally stratified natural body of water comprising maintaining a pumping means within the heavier subsurface layers of said body of water and pumping a substantially gas free and unconfined current of said heavier subsurface water to the surface, said current having an effective upward component whereby natural stratification of said body of water is decreased and the temperature of the body of water is made more uniform.

5. The process of maintaining a channel shaped portion of a normally frozen surface of a normally stratified natural body of water ice free comprising maintaining pumping means within the warmer subsurface layers of said body of water and pumping a substantially gas free and unconfined current of said warmer subsurface water to the surface, the direction of said current being at an angle to the vertical whereby natural stratification of said body of water is decreased and the temperature of the body of water is made more uniform.

6. The process of decreasing the thermal stratification in a normally thermally stratified natural body of water comprising maintaining a pumping means within the heavier subsurface layers of said body of water and pumping a substantially gas free and unconfined current of said heavier subsurface water to the surface, the direction of said current being at an angle to the vertical whereby natural stratification of said body of water is decreased and the temperature of the body of water is made more uniform.

References Cited in the file of this patent

FOREIGN PATENTS

| | | |
|---|---|---|
| 442,046 | France | June 10, 1912 |
| 308,110 | Italy | May 26, 1933 |